(12) United States Patent
Ozawa

(10) Patent No.: US 12,054,075 B2
(45) Date of Patent: Aug. 6, 2024

(54) SEAT CONTROL DEVICE

(71) Applicant: Koji Ozawa, Aichi (JP)

(72) Inventor: Koji Ozawa, Aichi (JP)

(73) Assignee: NIDEC MOBILITY CORPORATION, Aichi (JP)

( * ) Notice: Subject to any disclaimer, the term of this patent is extended or adjusted under 35 U.S.C. 154(b) by 342 days.

(21) Appl. No.: 17/686,411

(22) Filed: Mar. 4, 2022

(65) Prior Publication Data
US 2022/0281356 A1    Sep. 8, 2022

(30) Foreign Application Priority Data

Mar. 5, 2021 (JP) .................................. 2021-035067

(51) Int. Cl.
*B60N 2/02*    (2006.01)
(52) U.S. Cl.
CPC ....... *B60N 2/0244* (2013.01); *B60N 2/02246* (2023.08); *B60N 2/0296* (2013.01)
(58) Field of Classification Search
CPC .. B60N 2/0224; B60N 2/0244; B60N 2/0296; B60N 2/06; B60N 2/34
See application file for complete search history.

(56) References Cited

U.S. PATENT DOCUMENTS

| 8,328,282 | B2 * | 12/2012 | Maeda | ................... | B60N 2/856 |
| | | | | | 297/331 |
| 11,142,095 | B2 * | 10/2021 | Kim | ..................... | B60N 2/0244 |
| 2007/0106429 | A1 | 5/2007 | Endo et al. | | |
| 2011/0043015 | A1 | 2/2011 | Maeda et al. | | |

FOREIGN PATENT DOCUMENTS

| JP | 2007131138 A | 5/2007 |
| JP | 201142300 A | 3/2011 |
| JP | 2016129449 A | 7/2016 |

* cited by examiner

*Primary Examiner* — Tyler J Lee
(74) *Attorney, Agent, or Firm* — HAUPTMAN HAM, LLP

(57) ABSTRACT

A seat control device controls an electric seat in which a seat portion is moved by a predetermined distance by a first motor and a backrest is tilted by a predetermined angle by a second motor. The seat control device includes: a pinching detecting unit that detects an object being pinched between seats due to a movement of the seat portion based on a rotational state of the first motor and a predetermined threshold value. The threshold value is a threshold value that changes according to a tilt angle of the backrest such that pinching is easily detected as the tilt angle of the backrest increases.

7 Claims, 8 Drawing Sheets

$\alpha$: SEAT ANGLE (TILT ANGLE OF BACKREST)
$Fp$: REACTION FORCE VERTICALLY ACTING ON BACKREST
$Fa$: PINCHING LOAD APPLIED TO MOTOR OF SLIDE MECHANISM
$Ta$: PINCHING TORQUE APPLIED TO MOTOR OF RECLINING MECHANISM $Fa = Fp \times \cos\alpha$ $Ta = Fp \times L1$

SEAT CONTROL DEVICE

CROSS-REFERENCE TO RELATED APPLICATIONS

This application is based upon and claims the benefit of priority from Japanese Patent Application No. 2021-035067 filed on Mar. 5, 2021, the entire contents of which are incorporated herein by reference.

FIELD

One or more embodiments of the present invention relate to a device for controlling an electric seat equipped in a vehicle or the like, and particularly to a seat control device having a function of detecting pinching of foreign matter between seats.

BACKGROUND

A vehicle such as an automatic four-wheeled vehicle is equipped with electric seats that move back and forth by a rotation of a motor. In a case where a front-back position of such an electric seat is adjusted, in the related art, the seat position has been adjusted by manually operating an operation unit provided near the seat and moving the seat forward or backward. On the other hand, in recent years, a vehicle has appeared, which has a function of registering a seat position that suits a user's preference in advance, identifying the user at a time of boarding, and automatically moving the seat to a seat position corresponding to the user.

In the vehicle having the automatic adjustment function of the seat position as described above, if the front seat automatically moves backward in a state where a person is sitting or an object is placed on the back seat, the person or the object may be pinched between the front and back seats, thereby threatening safety. The same thing can happen in a manual electric seat. Therefore, the seat control device is required to have a function of detecting that pinching has occurred between the seats and promptly stopping a motor in a case where the pinching occurs. JP-A-2016-129449, JP-A-2007-131138, and JP-A-2011-42300 disclose a seat control device having such a pinching detection function.

SUMMARY

Some electric seats can automatically adjust not only the front-back position but also the tilt angle of the backrest. In this case, when the front seat moves backward and pinching occurs in a state where the tilt angle of the backrest is small, and when the front seat moves backward and pinching occurs in a state where the tilt angle is large, it was found from a result of analysis by the inventor that there was a difference in a load (pinching load) applied to the motor. The details will be described later, and in a case where the tilt angle of the backrest is small, the pinching load is large, and in a case where the tilt angle is large, the pinching load is small.

Therefore, if a threshold value for pinching detection is set to a large value by focusing on a large pinching load in a case where the tilt angle of the backrest is small, the pinching load does not exceed the threshold value thereby making it difficult to detect pinching in a case where the pinching occurs in a state where the tilt angle is large. On the other hand, if the threshold value for pinching detection is set to a small value by focusing on a small pinching load in a case where the tilt angle of the backrest is large, even though the pinching does not occur in the state where the tilt angle is small, when a force due to disturbance is applied, the pinching load exceeds the threshold value and pinching is easily detected erroneously.

One or more embodiments of the present invention are provided to a seat control device capable of accurately detecting pinching regardless of the tilt angle of the backrest of the seat.

A seat control device of a first aspect of the invention is a device for controlling an electric seat in which a seat portion is moved by a predetermined distance by a first motor and a backrest is tilted by a predetermined angle by a second motor, the seat control device including a pinching detecting unit that detects an object being pinched between seats due to a movement of the seat portion based on a rotational state of the first motor and a predetermined threshold value. The threshold value changes according to a tilt angle of the backrest such that pinching is easily detected as the tilt angle of the backrest increases.

In this way, for example, in a case where the tilt angle of the backrest is small, a large threshold value is applied to a large pinching load, and in a case where the tilt angle of the backrest is large, a small threshold value is applied to a small pinching load. Therefore, it is possible to determine the presence or absence of the pinching by using an optimum threshold value according to the tilt angle, and it is possible to prevent that the pinching is erroneously detected due to the small threshold value and conversely, the pinching cannot be detected due to the large threshold value, thereby improving a pinching detection accuracy.

In the first aspect of the invention, the threshold value may change continuously or change stepwise according to the tilt angle of the backrest.

A seat control device of a second aspect of the invention is a device for controlling an electric seat in which a seat portion is moved by a predetermined distance by a first motor and a backrest is tilted by a predetermined angle by a second motor, the seat control device including: a first pinching detecting unit that detects an object being pinched between seats due to a movement of the seat portion based on a rotational state of the first motor and a first threshold value; and a second pinching detecting unit that detects an object being pinched between seats due to a tilt of the backrest based on a rotational state of the second motor and a second threshold value. The first threshold value is a threshold value that changes according to a tilt angle of the backrest such that pinching is easily detected as the tilt angle of the backrest increases, and the second threshold value is a threshold value that does not change according to the tilt angle of the backrest.

In the second aspect of the invention, the seat control device may further include a control unit that controls operations of the first motor and the second motor based on a detection result of the first pinching detecting unit and a detection result of the second pinching detecting unit. When at least one of the first pinching detecting unit and the second pinching detecting unit detects the pinching, the control unit may cause the first motor and the second motor to be in a stopped state, or cause at least one of the first motor and the second motor to be reversed for a certain period of time.

Also in the second aspect of the invention, the first threshold value may change continuously or change stepwise according to the tilt angle of the backrest.

According to one or more embodiments of the present invention, it is possible to provide a seat control device capable of accurately detecting the pinching regardless of the tilt angle of the backrest of the seat.

DETAILED DESCRIPTION

Figure 1:
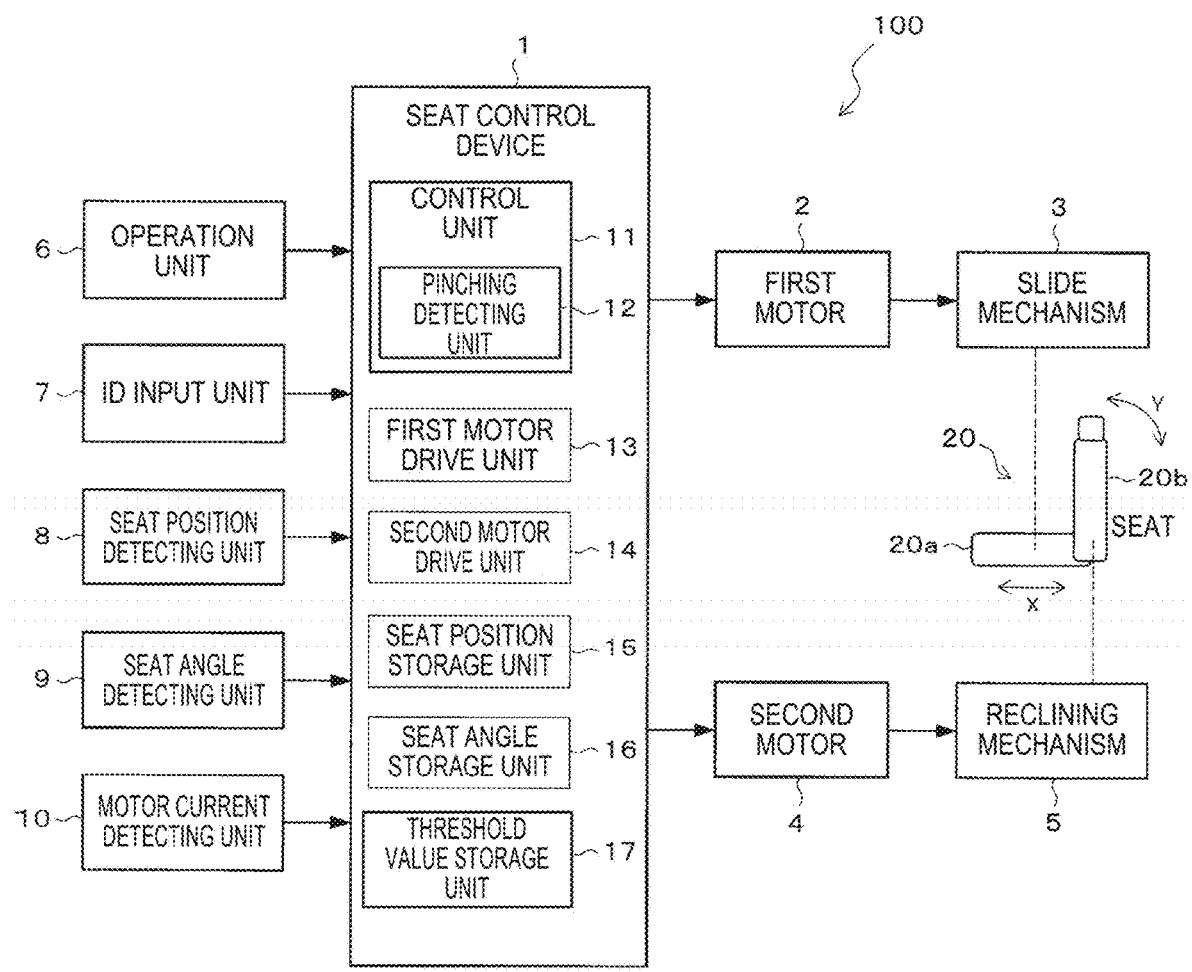
FIG. 1 is a block diagram of an electric seat system including a seat control device according to a first embodiment of the present invention.

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, embodiments of the present invention will be described with reference to the drawings. In the drawings, the same parts or corresponding parts are designated by the same reference numerals. In the following, an example in which a seat control device mounted on a vehicle will be given.

FIG. 1 illustrates an example of a seat control device 1 and an electric seat system 100 using the same according to a first embodiment of the present invention. The electric seat system 100 is mounted on a vehicle such as an automatic four-wheeled vehicle and includes the seat control device 1, a first motor 2, a slide mechanism 3, a second motor 4, a reclining mechanism 5, an operation unit 6, an ID input unit 7, a seat position detecting unit 8, a seat angle detecting unit 9, a motor current detecting unit 10, and a seat 20. The seat 20 is an electric seat driven in an X direction and a Y direction by the motors 2 and 4. In the present embodiment, the electric seat system 100 has a function of identifying a user and automatically moving the seat 20 to a pre-registered position as described at the beginning.

The first motor 2 is a motor for moving a seat portion 20a of the seat 20 in the X direction (front-and-rear direction). The slide mechanism 3 is coupled to the seat portion 20a, converts a rotational motion of the first motor 2 into a linear motion, and moves the seat portion 20a in the X direction by a predetermined distance.

The second motor 4 is a motor for tilting a backrest 20b of the seat 20 in the Y direction. The reclining mechanism 5 is coupled to the backrest 20b, and rotates and tilts the backrest 20b in the Y direction by a predetermined angle as the second motor 4 rotates.

The operation unit 6 is configured of switches for registering the position of the seat 20 in the X direction and manually operating an operation of the seat 20, and the like. The ID input unit 7 is configured of, for example, a communication circuit that communicates with an electronic key possessed by the user and reads identification information (ID) of the user from the electronic key. The seat position detecting unit 8 detects the position of the seat 20 in the X direction based on a rotation amount of the first motor 2. The seat angle detecting unit 9 detects a tilt angle of the backrest 20b of the seat 20 based on a rotation amount of the second motor 4. The motor current detecting unit 10 detects a motor current flowing through the first motor 2 and the second motor 4.

The seat control device 1 includes a control unit 11, a first motor drive unit 13, a second motor drive unit 14, a seat position storage unit 15, a seat angle storage unit 16, and a threshold value storage unit 17.

The control unit 11 is configured of a CPU and the like, and controls an overall operation of the seat control device 1. The control unit 11 includes a pinching detecting unit 12. A function of the pinching detecting unit 12 is actually realized by software. The detection of pinching will be described in detail later.

The first motor drive unit 13 is configured of a circuit that generates a drive signal (for example, a PWM signal) for rotating the first motor 2, and the like. The second motor drive unit 14 is also configured of a circuit that generates a drive signal (same as above) for rotating the second motor 4, and the like.

The seat position storage unit 15 stores the position of the seat 20 for each user registered by an operation of the operation unit 6. The seat angle storage unit 16 stores the tilt angle of the backrest 20b of the seat 20 for each user, which is also registered by the operation of the operation unit 6.

The threshold value storage unit 17 stores a determination threshold value for the pinching detecting unit 12 to determine the presence or absence of pinching between seats. This determination threshold value will be described in detail later.

In the electric seat system 100 having the above configuration, when the user gets on the vehicle, the ID of the user is input to the ID input unit 7 from the electronic key or the like, or a predetermined operation is performed by the operation unit 6, the seat 20 automatically moves to a predetermined position, and the backrest 20b of the seat 20 is tilted by a predetermined angle under the control of the seat control device 1.

Specifically, the control unit 11 reads out the seat position of the corresponding user stored in the seat position storage unit 15 and reads out the seat angle of the corresponding user stored in the seat angle storage unit 16. Then, the control unit 11 commands the rotation amount and the rotation direction of each motor to the first motor drive unit 13 and the second motor drive unit 14 based on the information.

The first motor drive unit 13 rotates the first motor 2 in a predetermined direction by a predetermined amount based on a command from the control unit 11. Therefore, the seat portion 20a of the seat 20 moves in the X direction via the slide mechanism 3. The position of the moving seat 20 is detected by the seat position detecting unit 8. When the detected seat position matches the position read out from the seat position storage unit 15, the control unit 11 stops the first motor 2 by the first motor drive unit 13.

Further, the second motor drive unit 14 rotates the second motor 4 in a predetermined direction by a predetermined amount based on a command from the control unit 11. Therefore, the backrest 20b of the seat 20 rotates in the Y direction via the reclining mechanism 5. When the rotation angle of the backrest 20b matches the seat angle read out from the seat angle storage unit 16, the control unit 11 stops the second motor 4 by the second motor drive unit 14.

Figure 5:
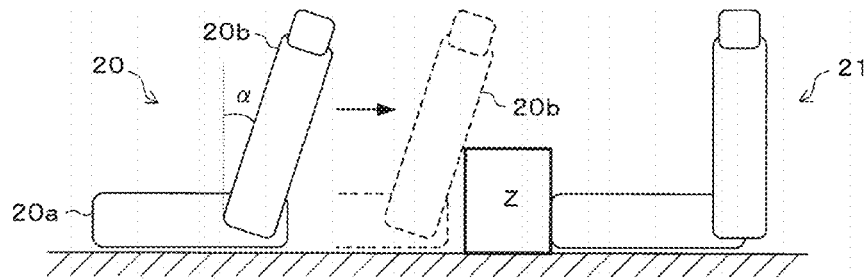
FIG. 5 is a diagram for explaining a difference in a pinching load by the seat angle.
Figure 6:
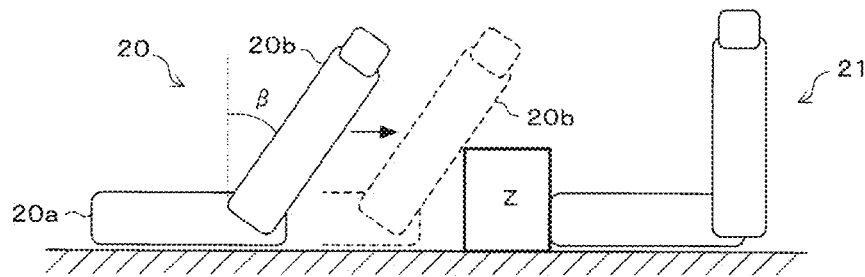
FIG. 6 is a diagram for explaining a difference in the pinching load by the seat angle.

Next, the detection of pinching between seats will be described in detail. FIGS. 5 and 6 illustrate a state where an object Z is pinched between the front seat 20 and a back seat 21. The object Z is, for example, a luggage, a human leg, an animal, or the like. In both cases of FIGS. 5 and 6, the front seat 20 moves in the direction of an arrow (backward) so that the object Z is pinched between the front and back seats 20 and 21.

Here, in FIG. 5, a tilt angle α of the backrest 20b of the seat 20 is small, whereas in FIG. 6, a tilt angle β of the backrest 20b of the seat 20 is large. A force acting on the backrest 20b as a reaction force from the pinched object Z is the same as in FIGS. 5 and 6, but a load (pinching load) applied to the first motor 2 via the slide mechanism 3 (FIG. 1) by this reaction force differs between FIGS. 5 and 6.

That is, as described at the beginning, in a case of FIG. 5 where the tilt angle α of the backrest 20b is small, the pinching load applied to the first motor 2 is large, and in a case of FIG. 6 where the tilt angle β of the backrest 20b is large, the pinching load applied to the first motor 2 is small. This will be described in more detail below.

Figure 7:
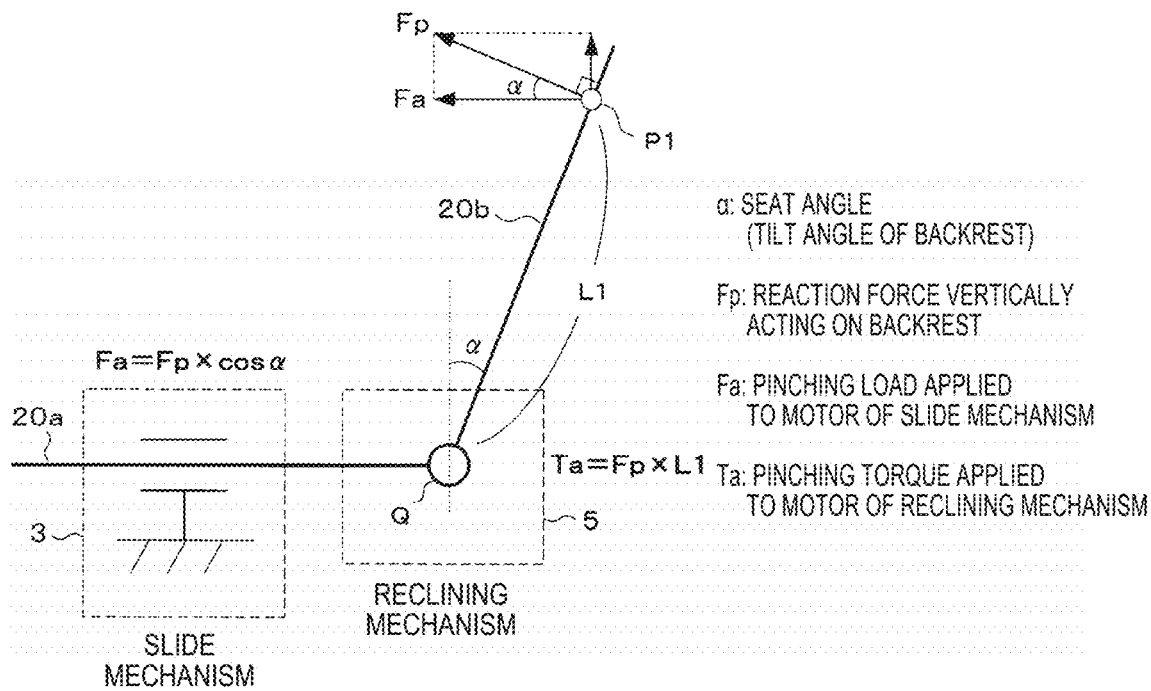
FIG. 7 is a diagram for explaining a pinching load in a case where the seat angle is small.

FIG. 7 is a schematic diagram for explaining the pinching load applied to the first motor 2 in a case where the pinching of FIG. 5 occurs. In FIG. 7, for the sake of simplicity, the seat portion 20a and the backrest 20b of the seat 20 are represented by straight lines, respectively. Further, the slide mechanism 3 and the reclining mechanism 5 are also illustrated in a simplified manner. The first motor 2 (FIG. 1) for driving the slide mechanism 3 and the second motor 4 (FIG. 1) for driving the reclining mechanism 5 are not illustrated in FIG. 7.

In FIG. 7, P1 represents a point where a reaction force Fp acts on the backrest 20b of the seat 20 from the object Z in FIG. 5. This reaction force Fp acts perpendicularly to the backrest portion 20b. Q represents a rotation center (rotation axis) of the backrest 20b. L1 represents a distance between P1 and Q, and a represents the same tilt angle as a in FIG. 5.

A component Fa in a horizontal direction of the reaction force Fp represents the pinching load applied to the first motor 2 (FIG. 1) via the slide mechanism 3, and is calculated by the following equation.

$$Fa = Fp \times \cos \alpha \qquad (1)$$

Further, Ta represents a pinching torque applied to the second motor 4 (FIG. 1) via the reclining mechanism 5, and is calculated by the following equation.

$$Ta = Fp \times L1 \qquad (2)$$

Figure 8:
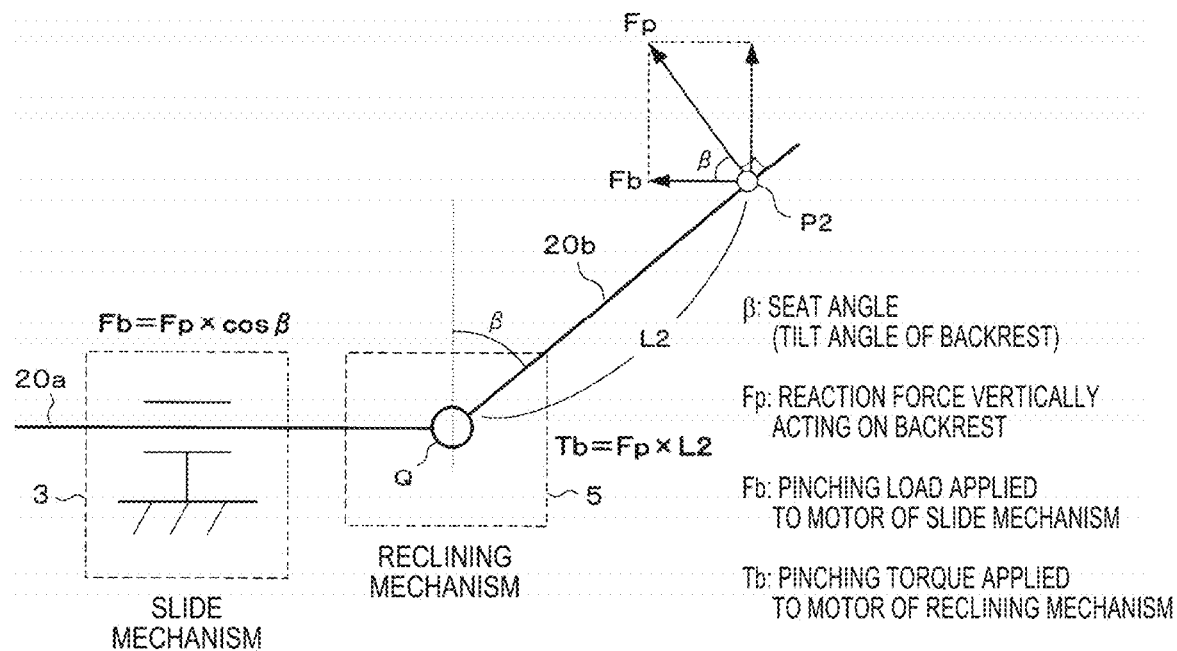
FIG. 8 is a diagram for explaining a pinching load in a case where the seat angle is large.

FIG. 8 is a schematic diagram for explaining the pinching load applied to the first motor 2 in a case where the pinching of FIG. 6 occurs. Also in FIG. 8, the seat portion 20a, the backrest 20b, the slide mechanism 3, and the reclining mechanism 5 of the seat 20 are illustrated in a simplified manner. P2 represents a point where the reaction force Fp acts on the backrest 20b of the seat 20 from the object Z in FIG. 6. Since a magnitude of the reaction force does not actually change even if the position where the reaction force acts changes, it is assumed that the reaction force Fp in FIG. 8 and the reaction force Fp in FIG. 7 are equal to each other. Q represents the same rotation center (rotation axis) as in FIG. 7, and L2 represents a distance between P2 and Q. β represents the same tilt angle as β in FIG. 6, and has a larger value than α in FIG. 7 (β>α).

In FIG. 8, a component Fb in the horizontal direction of the reaction force Fp represents the pinching load applied to the first motor 2 (FIG. 1) via the slide mechanism 3, and is calculated by the following equation.

$$Fb = Fp \times \cos \beta \qquad (3)$$

Further, Tb represents the pinching torque applied to the second motor 4 (FIG. 1) via the reclining mechanism 5, and is calculated by the following equation.

$$Tb = Fp - L2 \qquad (4)$$

Here, when comparing the pinching load Fa of FIG. 7 calculated by the equation (1) and the pinching load Fb of FIG. 8 calculated by the equation (3), β>α, so that if the reaction force Fp is the same, then Fa>Fb. That is, in a case where pinching occurs, the smaller the tilt angle of the backrest 20b is, the larger the pinching load applied to the first motor 2 is, and the larger the tilt angle of the backrest 20b is, the smaller the pinching load applied to the first motor 2 is.

Then, whether the pinching has occurred is determined by whether a state where the pinching load exceeds a certain value continues for a predetermined time. In this case, when the pinching load increases, a rotation speed of the first motor 2 decreases and a current flowing through the motor increases. Therefore, an increase or a decrease in the pinching load correlates with an increase or a decrease in the motor current. Therefore, the motor current detecting unit 10 (FIG. 1) detects the current flowing through the first motor 2, and the pinching detecting unit 12 calculates a change amount of the motor current and compares this change amount with a threshold value, and thereby it is possible to detect the pinching.

However, in a case of FIG. 7 where the tilt angle α of the backrest 20b is small, that is, when the threshold value is set to a large value focusing on a case where the pinching load Fa is large, in a case where the pinching occurs in a state where the tilt angle θ of the backrest 20b is large as illustrated in FIG. 8, since the threshold value is large, the pinching load Fb does not exceed the threshold value and it is difficult to detect the pinching.

On the other hand, in a case of FIG. 8 where the tilt angle β of the backrest 20b is large, that is, when the threshold value is set to a small value focusing on a case where the pinching load Fb is small, in a state where the tilt angle α of the backrest 20b is small as illustrated in FIG. 7, the force due to disturbance is applied to the seat. Therefore, even though the pinching does not occur, the pinching load Fa easily exceeds the threshold value and the pinching is easily detected erroneously. The disturbance occurs, for example, in a case where an occupant sitting in the seat shakes his or her body.

Therefore, in the embodiment of the present invention, the above-mentioned problems are solved by changing the threshold value according to the tilt angle of the backrest 20b so that the pinching is more easily detected as the tilt angle of the backrest 20b becomes larger. Hereinafter, the details will be described with reference to FIGS. 2 to 4.

Figure 2:
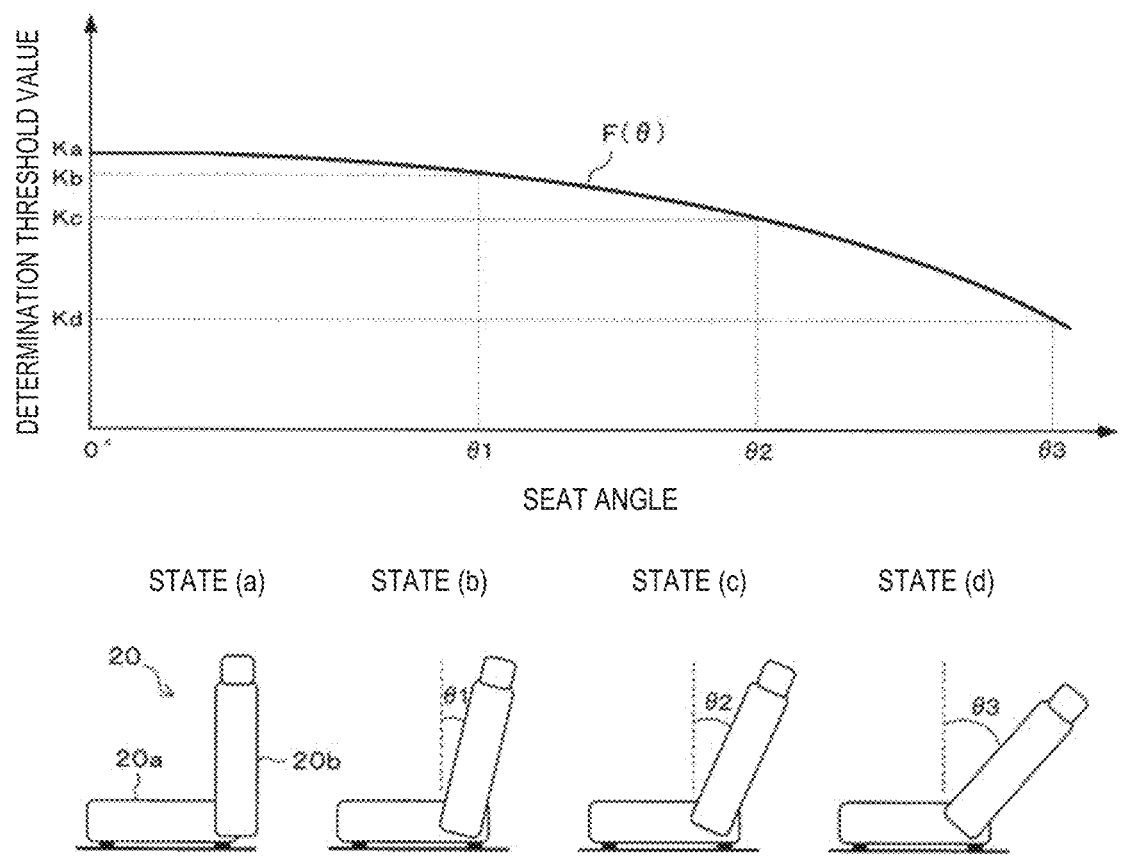
FIG. 2 is a graph illustrating an example of a threshold value that changes depending on a seat angle.

FIG. 2 illustrates an example of the threshold value used in the embodiment of the present invention. A horizontal axis of the graph indicates the seat angle (tilt angle of the backrest 20b), and a vertical axis of the graph indicates a threshold value (hereinafter referred to as a "determination threshold value") for determining the presence or absence of the pinching. In this example, the determination threshold value is a value according to a function F(θ) that changes continuously according to a seat angle θ, and the determination threshold value decreases as the seat angle θ increases.

For example, in a state (a) where the seat angle is 0°, the determination threshold value is Ka (initial value). In a state (b) where the backrest 20b is slightly tilted and the seat angle is θ1, the determination threshold value is reduced from Ka and becomes Kb. In a state (c) where the backrest 20b is further tilted and the seat angle is θ2, the determination threshold value is further reduced from Kb and becomes Kc. In a state (d) where the backrest 20b is tilted by a maximum amount and the seat angle is θ3, the determination threshold value is further reduced from Kc and becomes Kd.

When such a determination threshold value is used, in a case of FIG. 7 where the seat angle α is small, a large threshold value is applied to the large pinching load Fa, and in a case of FIG. 8 where the seat angle β is large, a small threshold value is applied to the small pinching load Fb. Therefore, it is possible to determine the presence or absence of the pinching by using an optimum threshold value according to the seat angle, and it is possible to prevent that the pinching is erroneously detected due to the small threshold value and conversely, the pinching cannot be detected due to the large threshold value, thereby improving the pinching detection accuracy.

Figure 3:
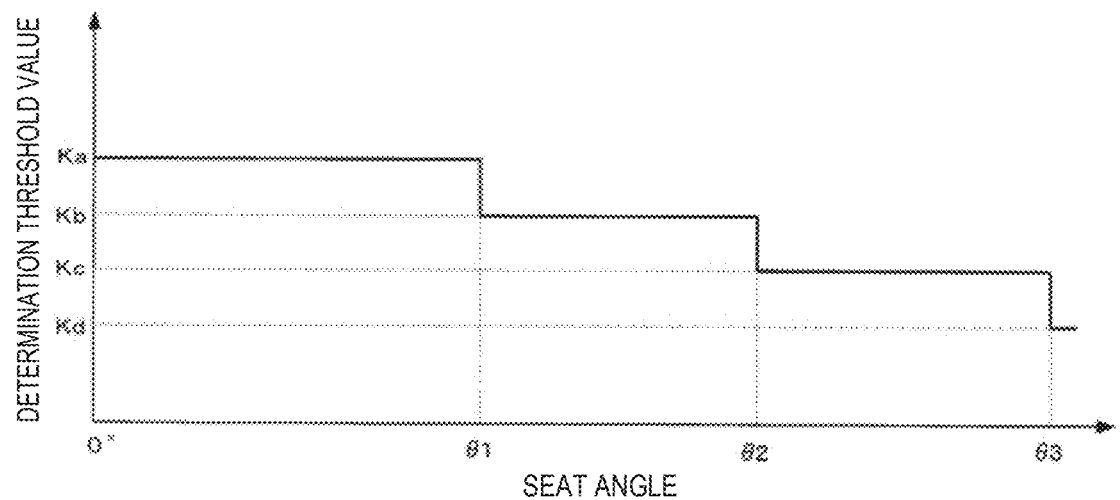
FIG. 3 is a graph illustrating another example of the threshold value that changes depending on the seat angle.
Figure 3:
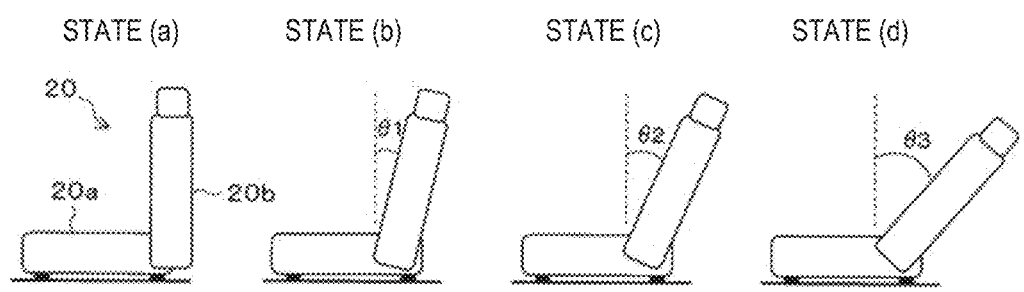

FIG. 3 illustrates another example of the determination threshold value. In this example, the determination threshold value changes stepwise according to the seat angle, and the determination threshold value decreases as the seat angle increases.

For example, in a state (a) where the seat angle is 0°, the determination threshold value is Ka (initial value). In a state (b) where the backrest 20b is slightly tilted and the seat angle is θ1, the determination threshold value is switched to Kb which is smaller than Ka. In a state (c) where the backrest 20b is further tilted and the seat angle is θ2, the determination threshold value is switched to Kc which is smaller than Kb. In a state (d) where the backrest 20b is tilted by a maximum amount and the seat angle is θ3, the determination threshold value is switched to Kd which is smaller than Kc.

Even if such a determination threshold value is used, in a case of FIG. 7 where the seat angle α is small, a large threshold value is applied to the large pinching load Fa, and in a case of FIG. 8 where the seat angle β is large, a small threshold value is applied to the small pinching load Fb. Therefore, it is possible to determine the presence or absence of the pinching by using an optimum threshold value according to the seat angle, and it is possible to prevent that the pinching is erroneously detected due to the small threshold value and conversely, the pinching cannot be detected due to the large threshold value, thereby improving the pinching detection accuracy.

Figure 4:
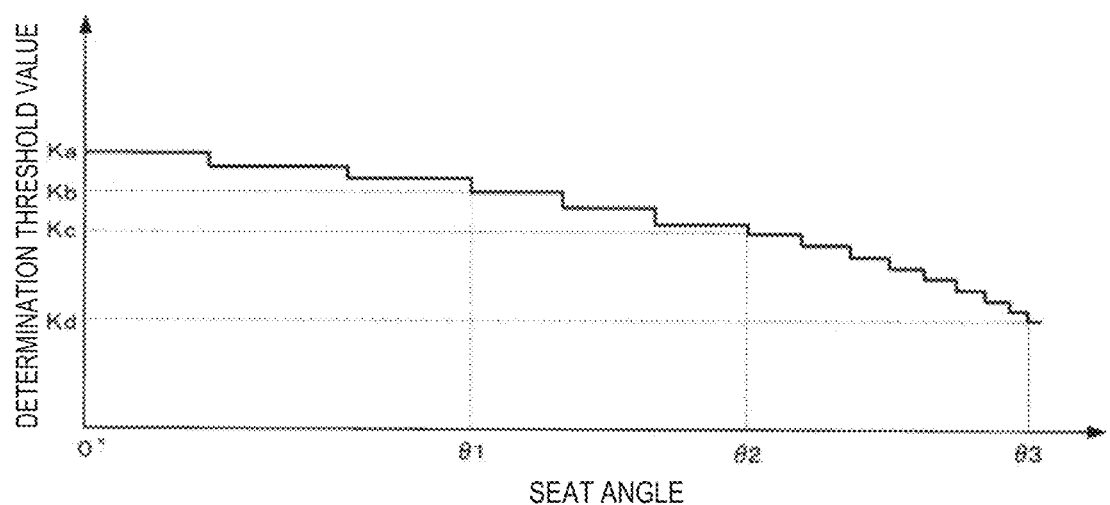
FIG. 4 is a graph illustrating another example of the threshold value that changes depending on the seat angle.
Figure 4:
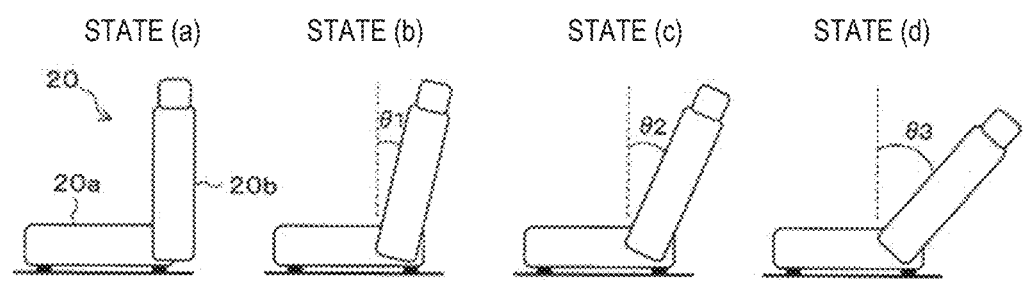

FIG. 4 illustrates another example of the determination threshold value. This example is a modified example of FIG. 3, and the stepwise change of the determination threshold value is finer than that of FIG. 3. As a result, the change in the determination threshold value is similar to that in FIG. 2. By using such a determination threshold value, it is possible to determine the presence or absence of the pinching and to improve the pinching detection accuracy based on an optimum threshold value according to the seat angle.

Figure 9:
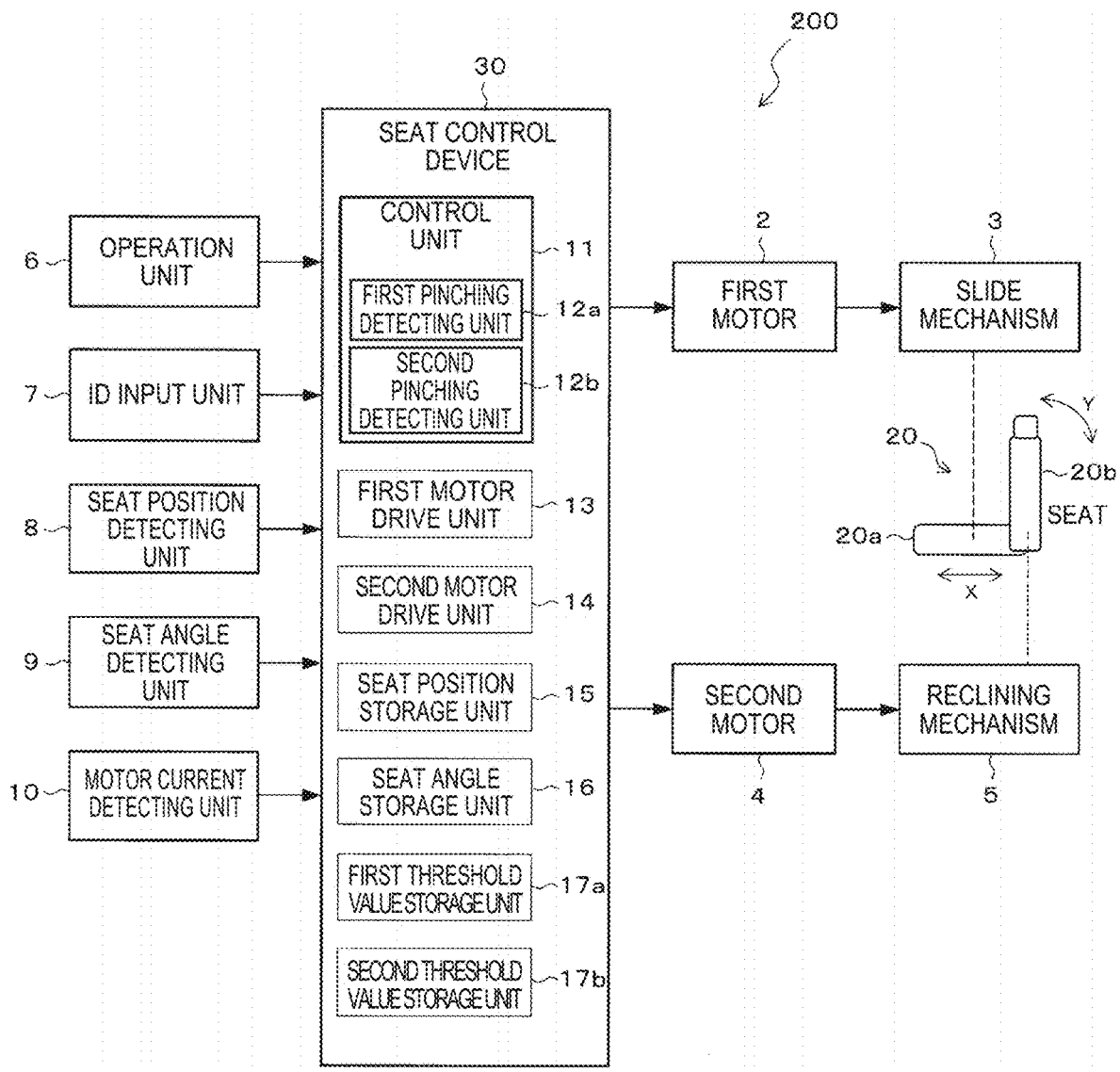
FIG. 9 is a block diagram of an electric seat system including a seat control device according to a second embodiment of the present invention.

FIG. 9 illustrates an example of a seat control device 30 and an electric seat system 200 using the same according to a second embodiment of the present invention. FIG. 9 is different from the first embodiment of FIG. 1 in that the seat control device 30 is provided with two pinching detecting units 12a and 12b, and two threshold value storage units 17a and 17b. Since other configurations are the same as those in FIG. 1, the description of the part overlapping with FIG. 1 will be omitted.

In FIG. 9, a first pinching detecting unit 12a detects that an object is pinched between the seats due to the movement of the seat portion 20a, and a second pinching detecting unit 12b detects that an object is pinched between the seats due to the tilt of the backrest 20b. A first threshold value storage unit 17a stores a first threshold value for the first pinching detecting unit 12a to detect the pinching, and a second threshold value storage unit 17b stores a second threshold value for the second pinching detecting unit 12b to detect the pinching.

The first pinching detecting unit 12a determines the presence or absence of the pinching based on the motor current of the first motor 2 detected by the motor current detecting unit 10 and the first threshold value stored in the first threshold value storage unit 17a. The second pinching detecting unit 12b determines the presence or absence of the pinching based on the motor current of the second motor 4 detected by the motor current detecting unit 10 and the second threshold value stored in the second threshold value storage unit 17b.

Here, the first threshold value stored in the first threshold value storage unit 17a is a threshold value that changes according to the tilt angle (seat angle) of the backrest 20b as illustrated in FIGS. 2 to 4. On the other hand, the second threshold value stored in the second threshold value storage unit 17b is a threshold value (fixed value) that does not change according to the tilt angle of the backrest 20b. The reason is as follows.

The pinching due to the tilt of the backrest 20b is detected by comparing pinching torques Ta and Tb illustrated in FIGS. 7 and 8 with the second threshold value. However, these torques Ta and Tb depend on distances L1 and L2 (that is, positions where the reaction force Fp acts) from the above equations (2) and (4), and do not depend on the tilt angle of the backrest 20b. Therefore, there is no point in changing the second threshold value according to the tilt angle.

In the second embodiment, the first pinching detecting unit 12a and the second pinching detecting unit 12b independently detect the pinching. Then, the control unit 11 controls operations of the first motor 2 and the second motor 4 based on a detection result of the first pinching detecting unit 12a and a detection result of the second pinching detecting unit 12b.

Figure 10A:
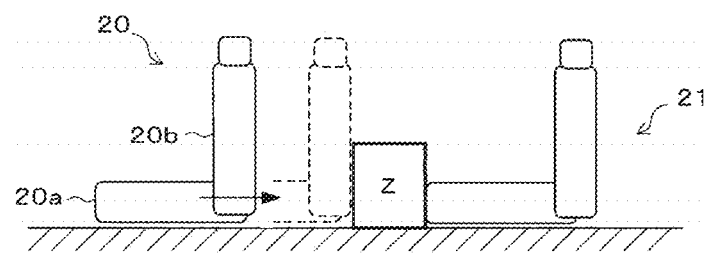
FIGS. 10A, 10B, and 10C are diagrams illustrating an application example of the second embodiment.

Specifically, as illustrated in FIG. 10A, in a case where the object Z is pinched between the seats 20 and 21 by moving the seat portion 20a in a state where the backrest 20b is not tilted, the pinching is detected only by the first pinching detecting unit 12a and the first motor 2 is stopped. As a result, both the first motor 2 and the second motor 4 are in the stopped state.

Figure 10B:
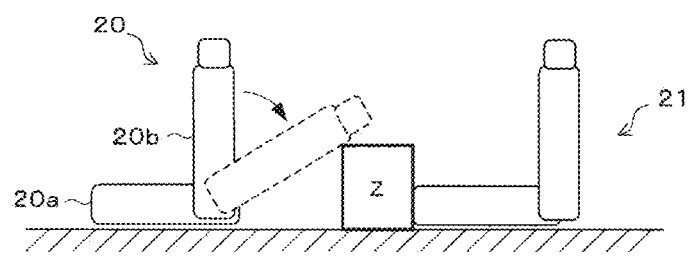

Further, as illustrated in FIG. 10B, in a case where the object Z is pinched between the seats 20 and 21 due to the seat portion 20a not moving and the backrest 20b being tilted, the pinching is detected only by the second pinching detecting unit 12b and the second motor 4 is stopped. As a result, both the first motor 2 and the second motor 4 are in the stopped state.

Figure 10C:
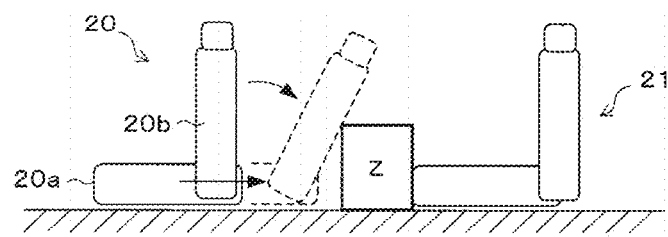

Further, as illustrated in FIG. 10C, in a case where the object Z is pinched between the seats 20 and 21 due to the movement of the seat portion 20a and the tilt of the backrest 20b performed in parallel at the same time, the pinching is detected by both the first pinching detecting unit 12a and the second pinching detecting unit 12b, the first motor 2 and the second motor 4 are stopped, and both motors are in the stopped state.

According to the second embodiment described above, in a case where at least one of the first pinching detecting unit 12a and the second pinching detecting unit 12b detects the pinching, the control unit 11 causes the first motor 2 and the second motor 4 to be in the stopped state. Therefore, even if any of the pinches illustrated in FIGS. 10A to 10C occurs, it is possible to ensure safety by stopping the motor.

In the embodiment of the present invention, it is possible to employ various embodiments in addition to the above-described embodiments.

For example, in the above-described embodiments, in a case where the pinching is detected, an example in which the first motor 2 and the second motor 4 are in the stopped state is given, but by reversing at least one (motor on the side where the pinching occurs) of the first motor 2 and the second motor 4 for a certain period of time, the seat portion 20a of the seat 20 is moved in the opposite direction, or the backrest 20b is rotated in the opposite direction. Therefore, the pinched state may be eliminated.

Further, in the above-described embodiments, in FIG. 1, an example in which the first motor drive unit 13 and the second motor drive unit 14 are provided in the seat control device 1 is given, but these motor drive units 13 and 14 may be provided outside the seat control device 1. The same applies to FIG. 9.

Further, in FIG. 1, the first motor 2 and the second motor 4 are provided outside the seat control device 1, but these motors 2 and 4 may be provided in the seat control device 1. The same applies to FIG. 9.

Further, in the above-described embodiments, in FIG. 2, an example in which the determination threshold value is curvedly decreased as the seat angle is increased is given, but the determination threshold value may be linearly decreased as the seat angle is increased. Further, the determination threshold value may be continuously decreased in a predetermined section of the seat angle, and the determination threshold value may be decreased stepwise in the other sections.

Further, in the above-described embodiments, an example in which the determination threshold value is set for the motor current is given, but the determination threshold value may be set for a rotation speed of the motor. In short, the presence or absence of the pinching may be determined based on the comparison result between the parameters such as the current and the rotation speed indicating the rotational state of the motor, and the determination threshold value.

Further, in the above-described embodiments, an example in which a vehicle having a function of automatically adjusting the seat position according to the user is given, but the present invention may be applied to a vehicle not having such a function.

Further, in the above-described embodiments, an example in which the seat control device is mounted on a vehicle such as an automatic four-wheeled vehicle is given, but the present invention may also be applied to a seat control device used in a field other than the vehicle.

While the invention has been described with respect to a limited number of embodiments, those skilled in the art, having benefit of this disclosure, will appreciate that other embodiments can be devised which do not depart from the scope of the invention as disclosed herein. According, the scope of the invention should be limited only by the attached claims.

The invention claimed is:

1. A seat control device that controls an electric seat in which a seat portion is moved by a predetermined distance by a first motor and a backrest is tilted by a predetermined angle by a second motor, the seat control device comprising:
   a pinching detecting unit that detects an object being pinched between seats due to a movement of the seat portion based on a rotational state of the first motor and a predetermined threshold value,
   wherein the threshold value is a threshold value that changes according to a tilt angle of the backrest such that pinching is easily detected as the tilt angle of the backrest increases.

2. The seat control device according to claim 1,
   wherein the threshold value changes continuously according to the tilt angle of the backrest.

3. The seat control device according to claim 1,
   wherein the threshold value changes stepwise according to the tilt angle of the backrest.

4. A seat control device that controls an electric seat in which a seat portion is moved by a predetermined distance by a first motor and a backrest is tilted by a predetermined angle by a second motor, the seat control device comprising:
   a first pinching detecting unit that detects an object being pinched between seats due to a movement of the seat portion based on a rotational state of the first motor and a first threshold value; and
   a second pinching detecting unit that detects an object being pinched between seats due to a tilt of the backrest based on a rotational state of the second motor and a second threshold value,
   wherein the first threshold value is a threshold value that changes according to a tilt angle of the backrest such that pinching is easily detected as the tilt angle of the backrest increases, and
   wherein the second threshold value is a threshold value that does not change according to the tilt angle of the backrest.

5. The seat control device according to claim 4, further comprising:
   a control unit that controls operations of the first motor and the second motor based on a detection result of the first pinching detecting unit and a detection result of the second pinching detecting unit,
   wherein when at least one of the first pinching detecting unit and the second pinching detecting unit detects the pinching, the control unit causes the first motor and the second motor to be in a stopped state, or causes at least one of the first motor and the second motor to be reversed for a certain period of time.

6. The seat control device according to claim 4,
   wherein the first threshold value changes continuously according to the tilt angle of the backrest.

7. The seat control device according to claim 4,
   wherein the first threshold value changes stepwise according to the tilt angle of the backrest.

* * * * *